(12) United States Patent
Jones

(10) Patent No.: US 6,445,708 B1
(45) Date of Patent: Sep. 3, 2002

(54) ATM SWITCH WITH VC PRIORITY BUFFERS

(75) Inventor: Trevor Jones, Maldon (GB)

(73) Assignee: Ahead Communications Systems, Inc., Middlebury, CT (US)

( * ) Notice: Subject to any disclaimer, the term of this patent is extended or adjusted under 35 U.S.C. 154(b) by 0 days.

(21) Appl. No.: 09/029,295

(22) PCT Filed: Oct. 2, 1996

(86) PCT No.: PCT/US96/15737
§ 371 (c)(1),
(2), (4) Date: Mar. 5, 1998

(87) PCT Pub. No.: WO97/13346
PCT Pub. Date: Apr. 10, 1997

(30) Foreign Application Priority Data

Oct. 3, 1995 (GB) .............................................. 9520147

(51) Int. Cl.[7] .............................................. H04L 12/28
(52) U.S. Cl. ...................................................... 370/397
(58) Field of Search ........................ 370/399, 395–398, 370/352, 412–416, 392, 417, 418, 230, 250, 390, 236; 709/234

(56) References Cited

U.S. PATENT DOCUMENTS

| | | | | |
|---|---|---|---|---|
| 5,309,432 A | * | 5/1994 | Kanakia | 370/412 |
| 5,311,509 A | * | 5/1994 | Heddes et al. | 370/397 |
| 5,436,893 A | * | 7/1995 | Barnett | 370/392 |
| 5,467,347 A | * | 11/1995 | Petersen | 370/399 |
| 5,487,061 A | * | 1/1996 | Bray | 370/392 |
| 5,517,495 A | * | 5/1996 | Lund et al. | 370/399 |
| 5,533,009 A | * | 7/1996 | Chen | 370/395 |
| 5,570,348 A | * | 10/1996 | Holden | 370/236 |
| 5,583,861 A | * | 12/1996 | Holden | 370/395 |
| 5,664,116 A | * | 9/1997 | Gaytan et al. | 709/234 |
| 5,793,748 A | * | 8/1998 | Murase | 370/417 |
| 5,818,842 A | * | 10/1998 | Burwell et al. | 370/397 |

* cited by examiner

Primary Examiner—Kwang Bin Yao
Assistant Examiner—Prenell Jones
(74) Attorney, Agent, or Firm—Patton Boggs LLP; James M. Graziano

(57) ABSTRACT

The present ATM switch includes a plurality of controllers, each of which contains a plurality of cell buffers to store cells for each VC. A plurality of arbitration buffers store pointers, on a VC priority level basis, to order the processing of cell transmissions. The arbitration buffers are processed in priority order, with an interrupt being generated by a timer associated with each arbitration buffer, other than the highest priority arbitration buffer, to ensure that each arbitration buffer is periodically processed.

10 Claims, 6 Drawing Sheets

ATM SWITCH WITH VC PRIORITY BUFFERS

BACKGROUND OF THE INVENTION

1. Field of the Invention

The invention relates to an asynchronous transfer mode (ATM) network switch. More particularly, the invention relates to an ATM switch having cell buffers for each virtual connection (VC) and means for outputting cells according to their VC priority.

2. State of the Art

In ATM data transmission cells of data conventionally comprising fifty-three bytes (forty-eight bytes carrying data and the remaining five bytes defining the cell header, the address and related information) pass through the network on a virtual connection at an agreed upon ate related to the available bandwidth and the level or service paid for. The agreed upon rate will relate not only to he steady average flow of data, but will also limit the peak flow rates.

Over an extensive network, cells on a virtual connection can become bunched together with different cells having different delays imposed upon them at different stages, so that the cell flow on a VC then does not conform with the agreed upon rates. To prevent rates being exceeded to the detriment of other VCs in the network, the network will include, for example at the boundary between different networks, means for policing the flow. The flow policing means typically includes a "leaky bucket" device which asses the pea and average flow rates of cells on a VC and if required either downgrades the cell's priority or discards cells. An example of such a device is disclosed in co-owned UK Patent Application No. 9505358.3 which is hereby incorporated herein in its entirety.

Since policing can result in the discarding of cells which should not be discarded, it is desirable to effect "traffic shaping" to space out the cells on a VC sufficiently so as to ensure that they meet the agreed upon rates, and in particular the peak rates. A problem with traffic shaping is that it is desirable to delay the transmission of cells by variable amounts in an attempt to avoid cell loss. In practice, however, variable cell delay has been difficult to implement. Co-owned UK Patent Application No. 9509483.5, which is hereby incorporated herein in its entirety, discloses an ATM switch with a traffic shaping mechanism which delays the transmission of incoming cells by varying amounts of time and which accounts for both peak and average cell flow rates. The traffic shaping mechanism broadly comprises means for determining for each cell received an onward transmission time dependent upon the time interval between the arrival of the cell and the time of arrival of the preceding cell on the same VC, buffer means for storing each new cell at an address corresponding to the onward transmission time, and means for outputting cells from the buffer means at a time corresponding to the address thereof. The traffic shaping mechanism results in cells being output at a rate which is related to the rate at which they are received which eliminates or minimizes bunching.

In some instances, however, it is desirable to provide a more even output of cells, regardless of the rate at which they are received. For example, different virtual connections may have different priority levels. Presently, the ATM standard provides for four different priority levels. In order to assure that a priority level is maintained, it may be necessary that cells having a high priority level be output before cells having a low priority level, regardless of the rate at which the cells are received.

SUMMARY OF THE INVENTION

It is therefore an object of the invention to provide an ATM switch with means for controlling the flow of cells through the switch according to VC priority.

It is also an object of the invention to provide an ATM switch with means for controlling the flow of cells through the switch according to VC priority and with means for preventing blockage of low priority cells.

It is an other object of the invention to provide an ATM switch with means for controlling the flow of cells through the switch according to VC priority and which also allows traffic shaping.

In accord with these objects which will be discussed in detail below, an ATM switch according to the invention includes a plurality of slot controllers each having at least one external network link and a link to a switch fabric, the slot controllers receiving ATM cells from the network and transmitting cells to other slot controllers via the switch fabric and receiving cells from the switch fabric and transmitting cells onto the network. Each slot controller is provided with a plurality of FIFO buffers, one cell FIFO for each VC established on the switch and one arbitration FIFO for each priority level, and a FIFO controller. According to the methods of the invention, when a cell enters a slot controller the cell header is examined to determine the VCI and the priority level. The slot controller examines the switch fabric to find a path for the VC, selects a VC FIFO for the VC, pushes the cell into the VC FIFO, increments a counter for the VC FIFO, an, if the VC FIFO was previously empty, writes a pointer to the arbitration FIFO for the priority level of the cell FIFO. The arbitration FIFOs are examined according to a schedule and cells are popped from VC FIFOs according to priority for exit from the slot controller. According to one embodiment of the invention, the highest priority arbitration FIFO is always examined first and none of the lower priority arbitration FIFOs are examined unless the highest priority arbitration FIFO is empty. According to another embodiment of the invention, timers are set for the lower priority arbitration FIFOs and if a timer expires for a lower priority arbitration FIFO, it is examined regardless of the contents of the highest priority arbitration FIFO. According to still another embodiment of the invention, the slot controllers are coupled to two switch fabrics and two sets of arbitration FIFOs are used, one set for each switch fabric. Prior to popping a cell from a FIFO into the switch fabric, the switch fabric is examined to determine if the path is broken and whether an alternate path exists through the second switch fabric. If an alternate path is available, the cell is not sent, but the pointer for the VC FIFO is pushed into the corresponding arbitration FIFO for the second switch fabric.

According to the invention, the FIFO buffers may be arranged only to buffer the flow of cells from the slot controller into the switch matrix. Alternatively, a second set of FIFO buffers may be arranged to buffer the flow of cells from the switch matrix into the slot controller. The buffering system of the invention may be used with or without traffic shaping Additional objects and a vantages of the invention will become apparent to those skilled in the art upon reference to the detailed description taken in conjunction with the provided figures.

DETAILED DESCRIPTION OF THE PREFERRED EMBODIMENTS

Figure 1:
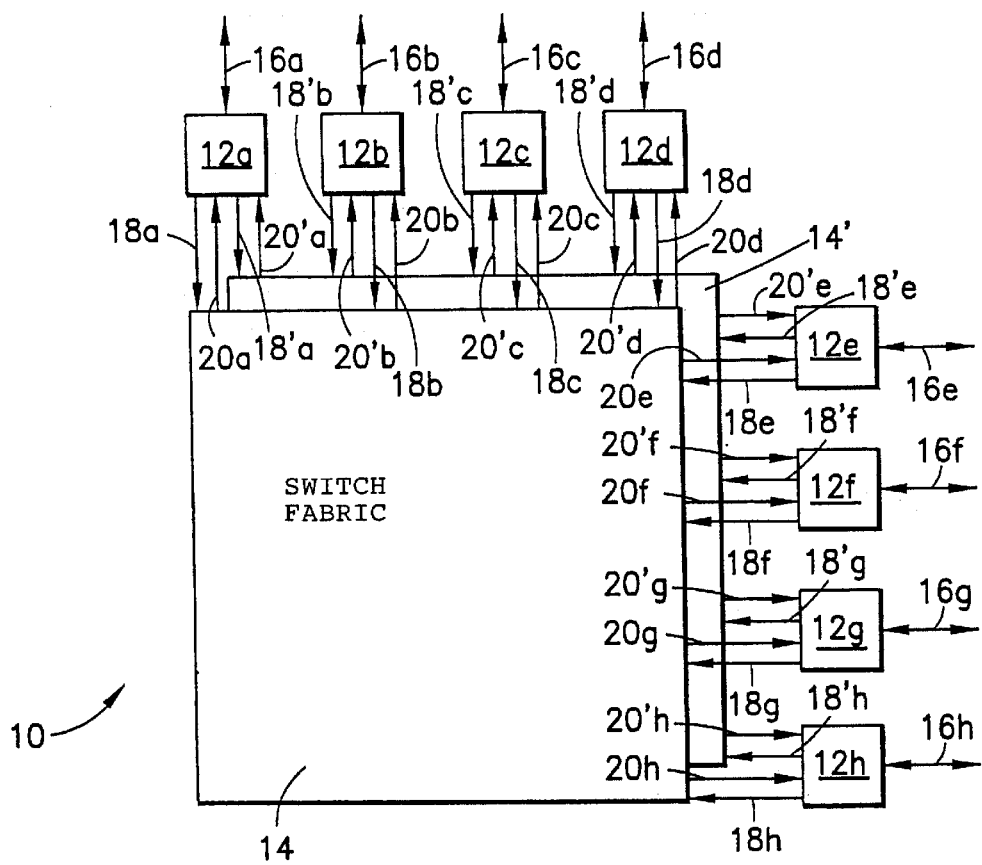
FIG. 1 is a high level schematic diagram of an ATM switch according to the invention.

Referring now to FIG. 1, an ATM switch 10 according to the invention includes a plurality of controllers (which are often called "slot controllers' or "link controllers") 12a–12g and two dynamic crosspoint switch fabrics 14, 14'. Each slot controller has at least one external link 16a–16h to an ATM network (not shown), an input link 18a–18h to the switch fabric 14, an output link 20a–20h from the switch fabric 14, an input link 18'a18'h to the switch fabric 14', an output link 20'a–20'h from the switch fabric 14'. This general arrangement is described in co-owned UK Patent Application No. 9507454.8 and UK Patent Application No. 9505358.3 which are hereby incorporated herein in their entireties.

Figure 2:
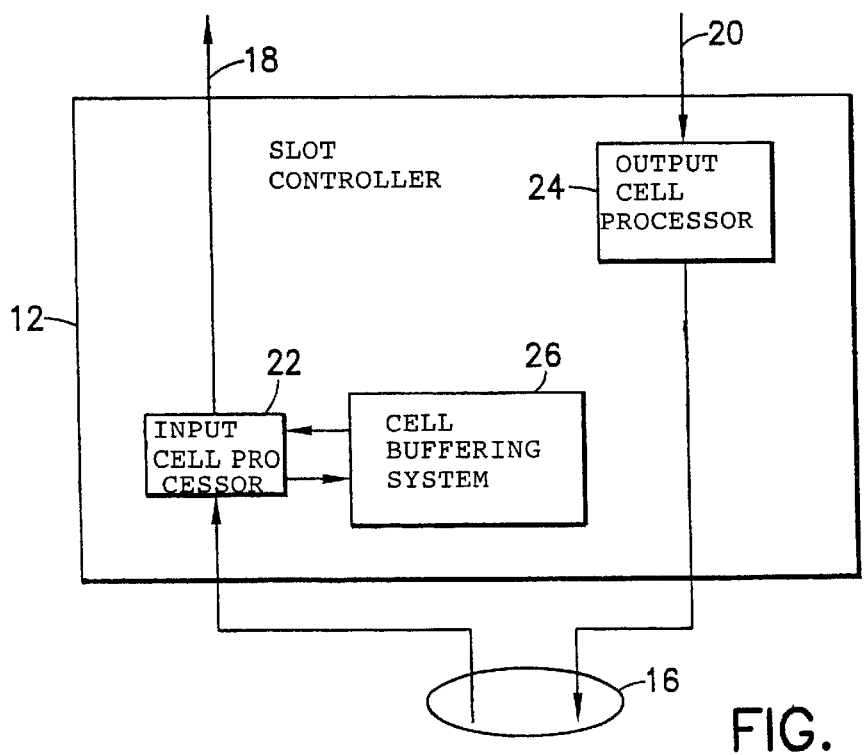
FIG. 2 is a high level schematic diagram of a slot controller according to a first embodiment of the invention.

As shown generally in FIG. 2, each slot controller 12 has an input cell processor 22, an output cell processor 24, and a cell buffering system 26. According to a first embodiment of the invention, the cell buffering system 26 is coupled to the input cell processor 22 for buffering cells received from the ATM network before they pas through the switch 10. In this embodiment of the invention, the output cell processor 24 is conventional and handles such functions as writing cell headers with new VPI/VCI information before passing cells onto the network. The input cell processor 22 is unconventional in that it controls the buffering system 26 in addition to other conventional functions such is reading cell headers and routing cells through the switch fabric to another slot controller.

Figure 3:
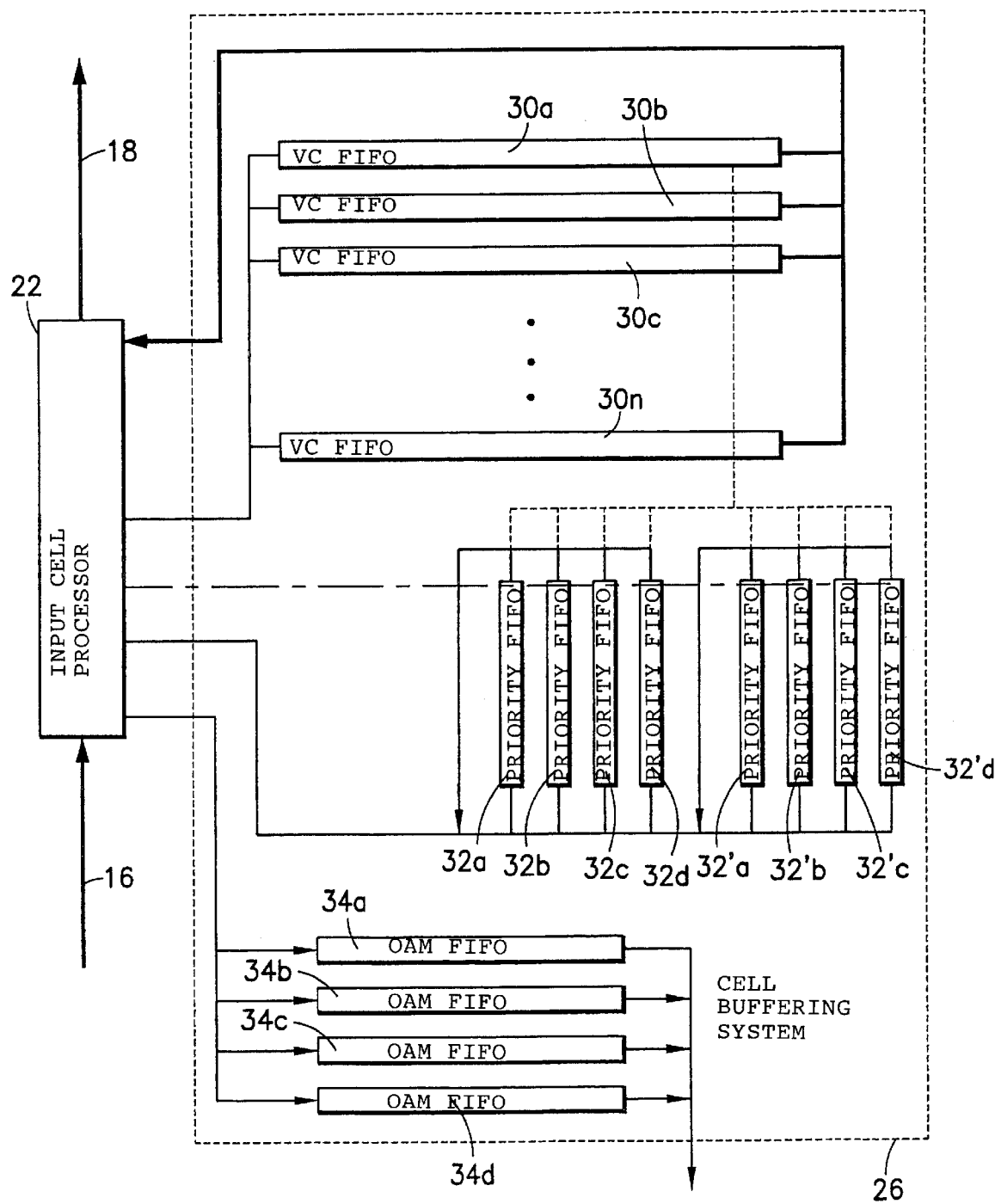
FIG. 3 is a high level schematic diagram of a cell buffering system according to one embodiment of the invention.

Turning now to FIG. 3, the buffering system 26 generally includes a plurality of VC FIFOs 30a, 30b, 30c, . . . , 30n, a plurality of priority level arbitration FIFOs 32a–32d, 32'a–32'd, and a plurality of OAM FIFOs 34a–34d. The FIFOs are coupled to the input cell processor and controlled by the input cell processor as described below with reference to FIGS. 4 and 5. According to the presently preferred embodiment of the invention, the VC FIFOs are not individual hardware components but are rather dynamically configured in RAM as needed. The number of FIFOs created depends on the number of VCs being handled by the particular slot controller. According to the invention, when a cell is inspected by the cell processor 22 to determine the VCI of the cell, a FIFO is created for that VC (if one does not already exist). Typically, each VC FIFO would be a 64 K FIFO, although FIFOs of different sizes could be used depending on the number of cells expected for a particular VC. The arbitration FIFOs are preferably also dynamically configured in RAM. The number of arbitration FIFOs corresponds to the number of priority levels for VCs through the switch. As shown in FIG. 3, there are four arbitration FIFOs representing the current ATM priority levels of "0" through "3"("0" being the highest priority). In the presently preferred embodiment, a separate set of arbitration FIFOs is used for each switch fabric. Thus, as shown in FIG. 3, FIFOs 32a–32d would be use, for switch fabric 14 (FIG. 1) and FIFOs 32'a32'd would be listed for switch fabric 14'. The OAM FIFOs 34a'34d are also prefer ably dynamically configured in RAM. The number of OAM FIFOs corresponds to the number of priority levels. The input cell processor 22 utilizes the OAM FIFOS to buffer Operations and Maintenance cells which are handled by an OAM processor (not shown).

Figure 4:
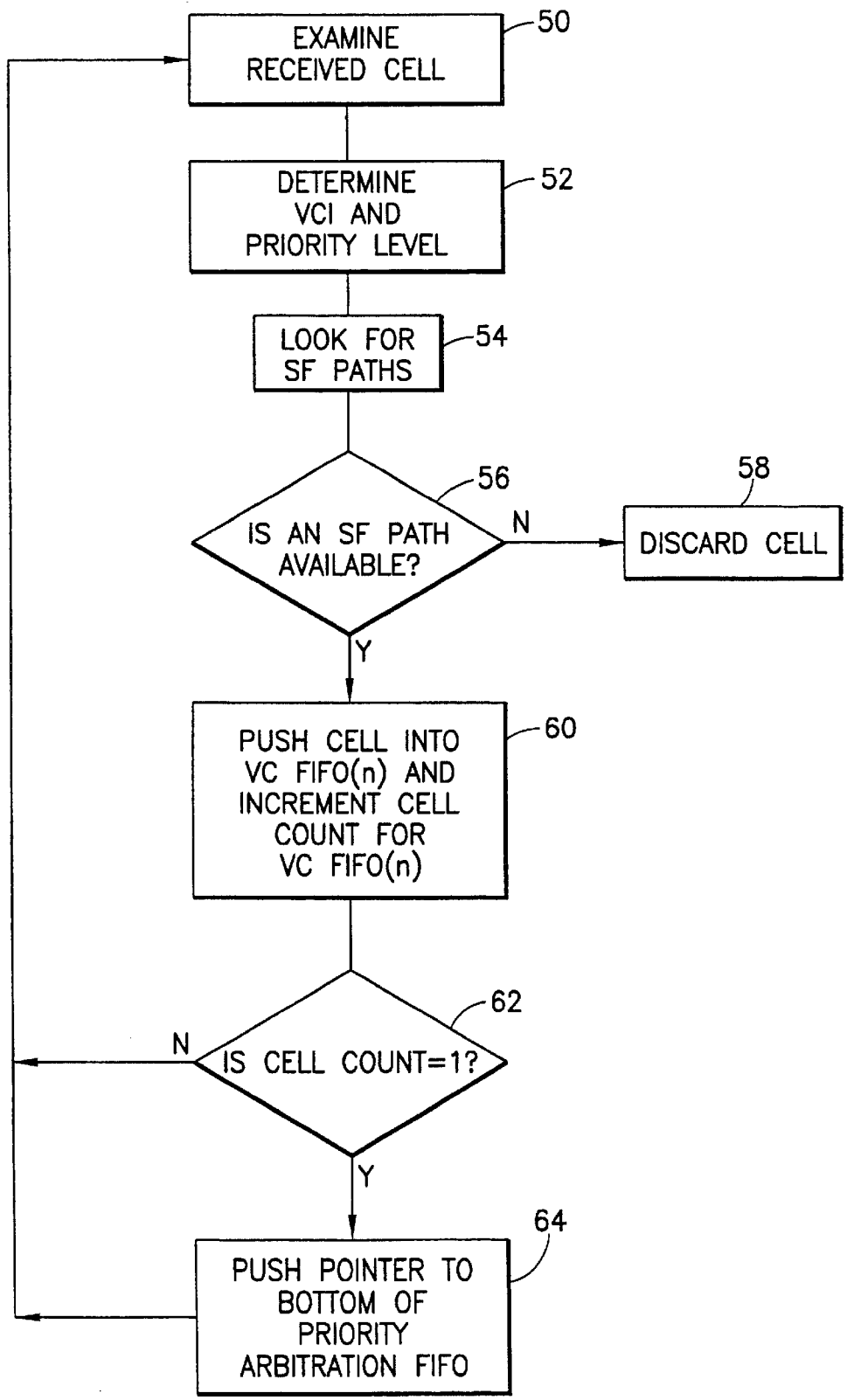
FIG. 4 is a schematic flow chart of how cells entering the buffering system are handled.
Figure 5A:
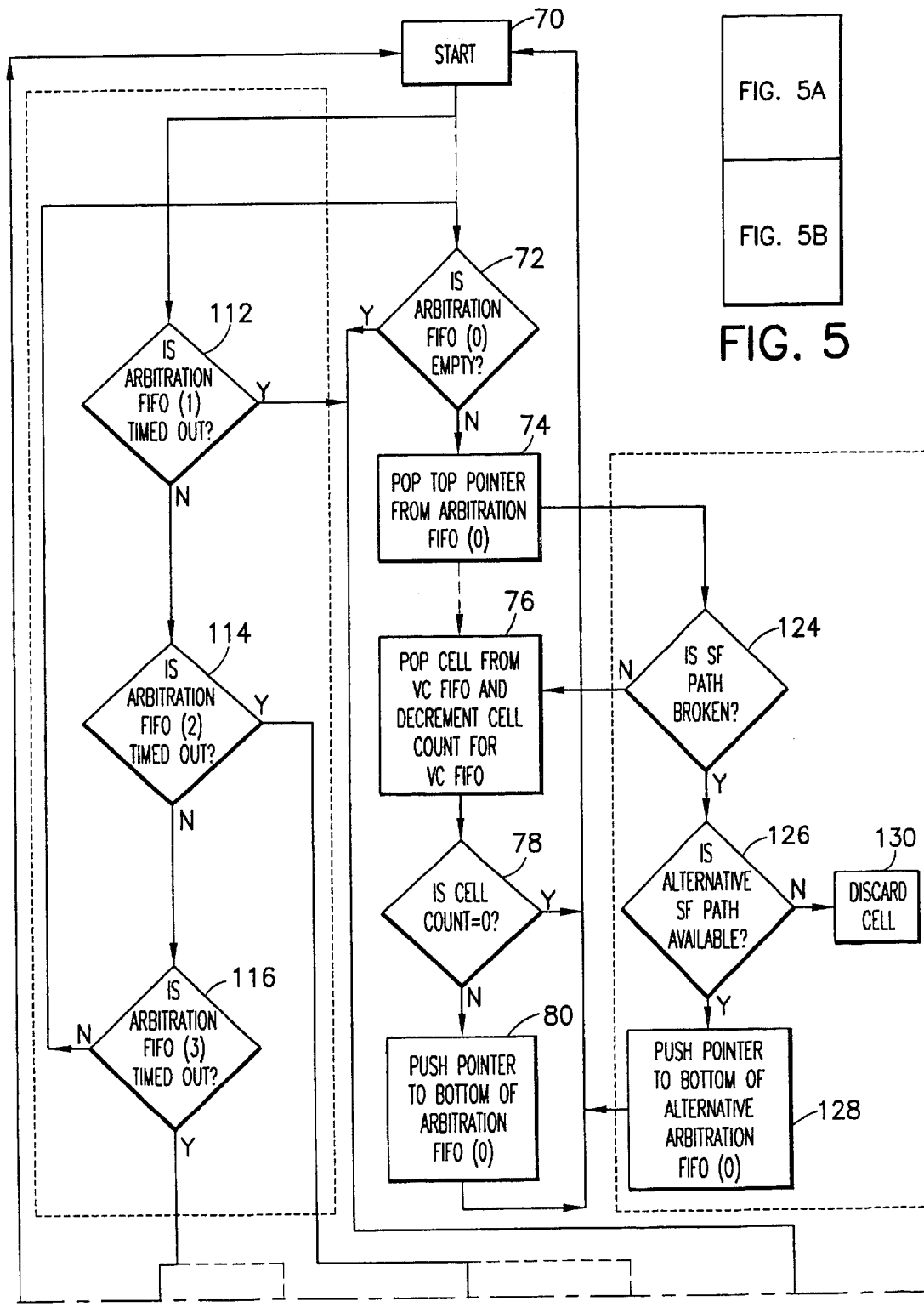
FIG. 5 is a schematic flow chart of how cells exiting the buffering system are handled.
Figure 5B:
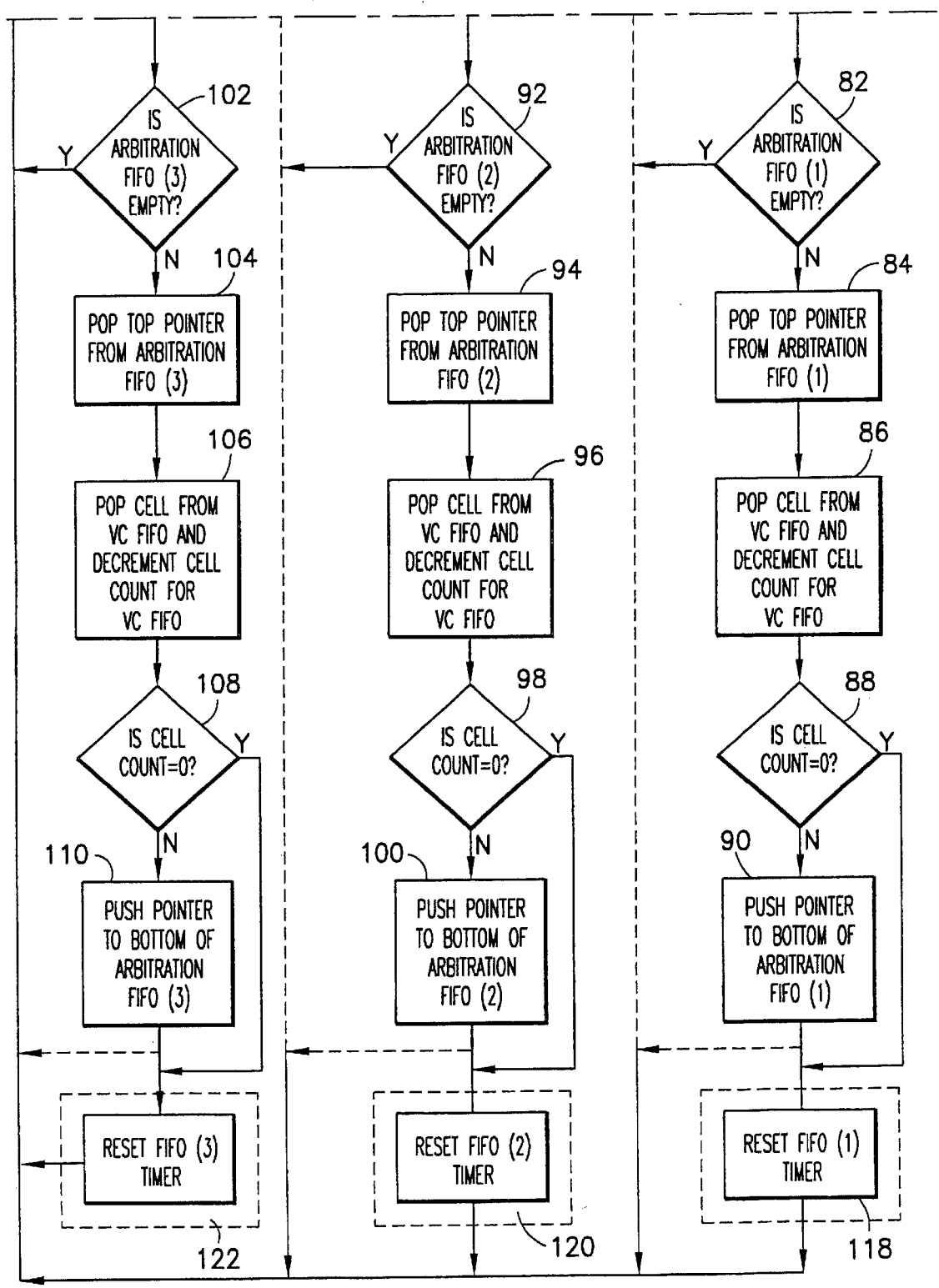

The operation of the buffering system 26 is further illustrated with reference to FIGS. 4 and 5 where FIG. 4 illustrates cells entering the buffer system and FIG. 5 illustrates cells exiting the buffer system.

Turning now to FIG. 4, when a cell enters the input cell processor, the header is examined at 50 and the VCI and priority level are determined at 52. The cell processor inspects the switch fabric at 54 to determine whether a path is available for the VC. If, at 56, it is determined that no path exists for the VC, the cell is discarded at 8. If a path does exist, the cell processor pushes the cell into VC FIFO(n), where "n" represents the VC, and increments a cell counter for VC FIFO(n) at 60. If it is determined at 62 that the cell count for VC FIFO(n) is "1", i.e. that the FIFO was previously empty, a pointer pointing to VC FIFO(n) is written and pushed at 64 into the appropriate arbitration FIFO depending on the priority level of the cell which was determined at 52. he cell processor then returns to 50 to examine the next cell received from the network. If it is determined at 62 that the VC FIFO was not previously empty, no pointer is written and the cell processor returns to 50 to examine the next cell received from the network. This process is repeated for each cell received by the input cell processor and new VC FIFOs are created as needed for new VCs. Similarly, empty VC FIFOs are released from RAM so that RAM is made available for new VC FIFOs. As the above d scribed process continues, the cell processor outputs cells to the switch fabric from the VC FIFOs according to a selected procedure. FIG. 5 shows a presently preferred procedure with optional portions shown in phantom line boxes.

Turning now to FIG. 5, the output procedure starts at 70. According to the essential principles of the invention, the arbitration FIFOs are examine to determine whether they contain pointers to VC FIFOS. In a simplified embodiment of the invention, the highest priori y FIFO (0) is always examined first at 72. If the FIFO is not empty, the top pointer in the FIFO is popped at 74. At 76, the VC FIFO to which the pointer points is popped and the cell count for the VC FIFO is decremented. If it is determined at 78 that the cell count of the VC FIFO is zero, the procedure returns to the start 70 and examines the arbitration FIFO (0) again at 72. If it is determined at 78 that the cell count of the VC FIFO is not zero, the pointer to the VC FIFO is pushed back into the arbitration FIFO (0) at 80 and the procedure then returns to start 70 and examines the arbitration FIFO (0) again at 72. According to this simplified embodiment of the invention, none of the other arbitration FIFOs are examined until the FIFO (0) is empty as determined at 72. If it is determined at 72 that the arbitration FIFO (0) is empty, the procedure goes to 82 and examines the contents of arbitration FIFO (1). If the arbitration FIFO (1) is determined at 82 to contain pointers, the top pointer is popped at 84, the corresponding VC FIFO is popped at 86, the pointer is pushed back into FIFO (1) at 90 if it is determined at 88 that the VC FIFO is not empty, and the procedure returns to the start at 70. Only if it is determined at 82 that tie arbitration FIFO (1) is empty, will the procedure go to 92 to examine the contents of arbitration FIFO (2). If, at 2, it is determined that the arbitration FIFO (1) is empty, the procedure described above is repeated at 92–100 with respect to the arbitration FIFO (2). Only if it is determined at 92 that the arbitration FIFO (2) is empty, will the procedure go to 102 to examine the contents of arbitration FIFO (3). If, at 92, it is determined that the arbitration FIFO (2) is empty, the procedure described above is repeated at 102–110 with respect to the arbitration FIFO (2).

The above simplified embodiment of the invention may be enhanced by setting a timer for each of the three lower level arbitration FIFOs. According to a second embodiment of the invention, after the procedure starts at 70, timers are examined at 112–116 before examining the arbitration FIFO (0). In particular, the timer for arbitration FIFO(l) is examined at 112 and if it has expired the procedure goes to 82 where the arbitration FIFO (1) is examined as described above. In addition, the timer for arbitration FIFO (1) is reset at 118 before the procedure returns to start at 70. If the timer for arbitration FIFO (1) has not expired as determined at 112, the timer for arbitration FIFO (2) is examined at 114 and if it has expired the procedure goes to 92 where the arbitration FIFO (2) is examined as described above. In addition the timer for arbitration FIFO (2) is reset at 120 before the procedure returns to start at 70. If the timer for arbitration FIFO (2) has not expired as determined at 114, the timer for arbitration FIFO (3) is examined at 116 and if it has expired the procedure goes to 102 where the arbitration FIFO (3) is examined as described above. In addition, the timer for arbitration FIFO (3) is reset at 122 before the procedure returns to start at 70. In this embodiment, the decisions at 82, 92, and 102 may be modified such that upon determining that an arbitration FIFO is empty, the procedure returns to start, rather than to examine the next arbitration FIFO.

In addition to the above the procedure may be further enhanced by testing whether paths through the switch fabric have broken. For example, after the VC pointer is popped at 74, but before the cell is popped from the VC FIFO into the switch, the cell processor determines at 124 if the switch fabric path for this VC is broken. If it is, the cell processor determines at 126 whether an alternate path is available through the second switch fabric. If an alternative path is available, the cell processor pushes the pointer 128 into the appropriate arbitration FIFO for the second switch fabric and then returns to start at 70. If the path is broken and no alternative path is available, the cell is discarded at 130. It will be appreciated that this testing of the switch fabric may be implemented for each arbitration FIFO. Therefore, the routines at 82–90, 92–100, and 102–110 would be modified to include the same steps as described with reference to 124–130. Those skilled in the art will appreciate that the pointers stored in the arbitration FIFOS preferably include information for output port number, switch fabric preference, and priority, in addition to the VC information.

According to still another embodiment of the invention, the arbitration of the buffering system can be further enhanced to deal with "blocked ports". According to this embodiment, another arbitration FIFO is created for pointers to VCs having blocked ports. The blocked port arbitration FIFO is then given the highest priority. Since the presence of a single blocked port could, under this system, prevent all cells from being transmitted until a particular port becomes un-blocked, the pointers in the blocked port arbitration FIFO are preferably recycled each time a pointer encounters a blocked port. In other words, when a pointer is popped from a blocked port arbitration FIFO, the pointer is pushed back to the bottom of the FIFO if it points to a VC which continues to have a blocked port. According to a presently preferred implementation, a separate blocked port FIFO is provided for each priority arbitration FIFO so that the blocked ports are also dealt with according to priority level.

Figure 6:
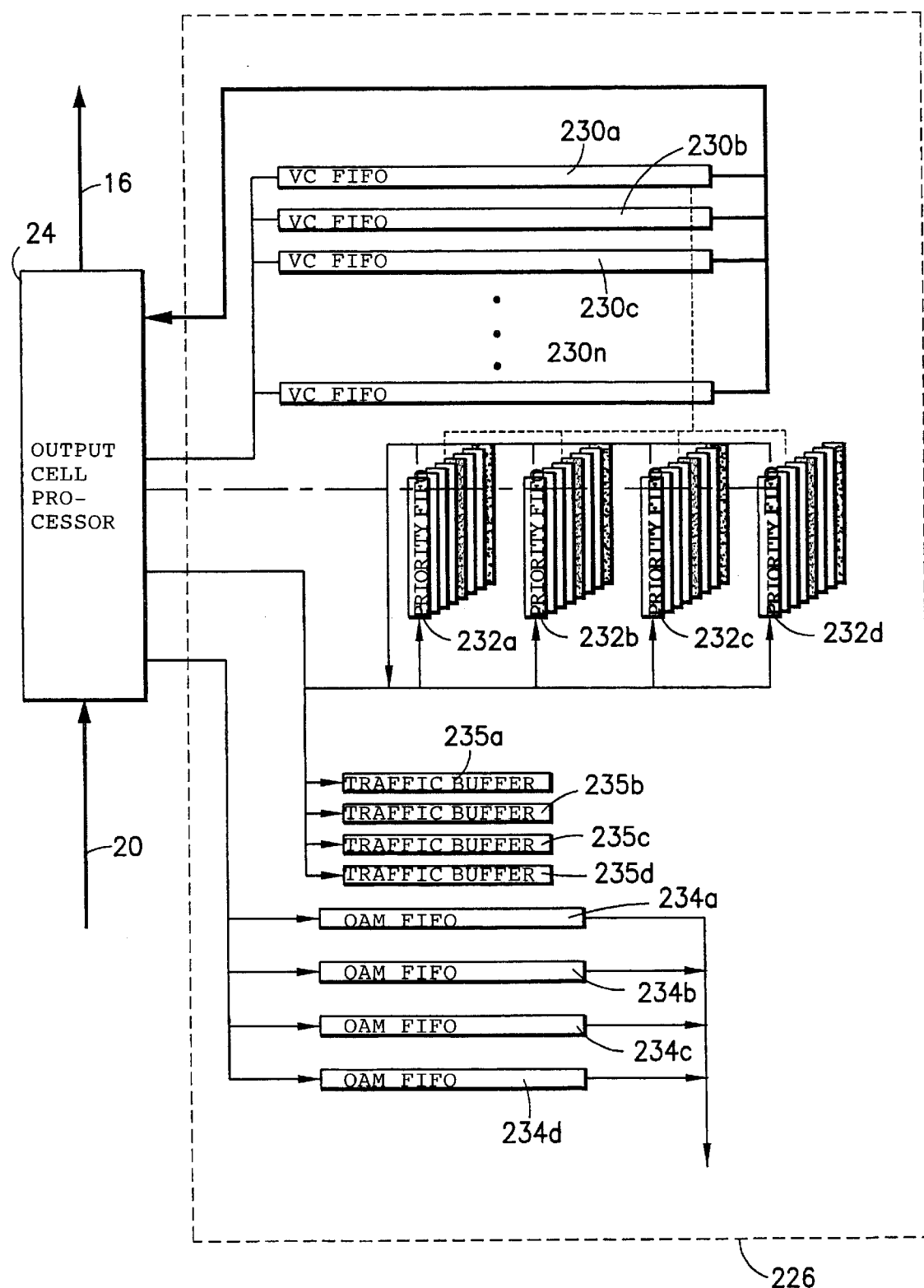
FIG. 6 is a high level schematic diagram of a cell buffering system according to another embodiment of the invention.

The cell buffering systems described above are suitably used to buffer cells entering the ATM switch. However, similar systems can be used to buffer cells exiting the ATM switch when no traffic shaping is required, e.g. constant bit rate (CBR) traffic. Alternatively, the buffering system described above can be used in conjunction with the traffic shaping system described in the above-referenced co-owned application. Still alternatively, the buffering system described above can be employed where the cells exit the switch and modified to accomplish traffic shaping. FIG. 6 shows a buffer system according to the invention arranged to buffer cells exiting the switch and for traffic shaping.

Turning now to FIG. 6, the buffering system 226 is similar to the buffering system 26 described above with similar components identified with similar reference numerals increased by 200. The system 226 generally includes a plurality of VC FIFOs 230a, 230b, 230c, . . . , 230n, a plurality of priority level arbitration FIFOs 232a–232d, and a plurality of OAM FIFOs 234a–234d. The FIFOs are coupled to the output cell processor 24 and controlled by the output cell processor as described above with the following differences. A separate set of priority arbitration buffers is provided for each external data link on the slot controller. For example, as shown in FIG. 6, there are eight arbitration FIFOs shown for each class of traffic 232a–232d. This corresponds to eight external data links. The arbitration FIFOs are preferably examined for a particular priority for each data link in sequence. In other words, the first of eight FIFOs 232a is read for a pointer, then the next of the eight FIFOs 232a is read or a pointer, until each of the eight FIFOs 232a is read for pointer. Otherwise, the arbitration operates in substantially the same manner as described above with regard t the system 26.

As shown in FIG. 6, the buffering system 226 may also include a set of traffic shaping buffers 235a –235d containing pointers having addresses which correspond to the time at which the cell pointed to is to be sent. This corresponds to the traffic shaping system described in the previously referenced co-owned patent application with the following difference: the pointers in the traffic shaping buffers point to a VC FIFO rather than to a particular cell. Depending on the type of VC, a pointer to a VC FIFO (230a, 230b, 230c, . . . , 230n) may be written in either a priority arbitration FIFO 232a–232d, or to an appropriate traffic shaping FIFO 235a–235d.

There have been describe and illustrated herein several embodiments of a ATM switch with VC priority buffers. While particular embodiments of the invention have been described, it is not intended that the invention be limited thereto, as it is intended that the invention be as broad in scope as the art will allow and that the specification be read likewise. Thus, while particular numbers and types of FIFO buffers have been disclosed, it will be appreciated that other numbers and types of FIFOS could be utilized. Also, while particular procedures have been shown for reading the arbitration buffers, it will be recognized that other types of procedures could be used. Moreover, while particular configurations have been disclosed in reference to the operations of the input and output cell processors, it will be appreciated that other configurations could be used as well. For example, the management of the arbitration and VC FIFOs could be accomplished by a separate processor and not delegated to the input and. output cell processors.

Furthermore, while the ATM switch has been disclosed as having eight slot controllers and the slot controllers have been shown with eight data links, it will be understood that different numbers of slot controllers and data links can be used.

It will therefore be appreciated by those skilled in the art that yet other modifications could be made to the provided invention without deviating from its spirit and scope as so claimed.

What is claimed is:

1. An ATM network switch, comprising:
   at least one switch fabric; and
   a plurality of controllers, each comprising:
   an input link and an output link to said at least one switch fabric;
   at least one external link to an ATM network;
   means for receiving ATM cells from the ATM network;
   means for determining the VC of cells received from the ATM network;
   a plurality of cell buffer means for separately buffering groups of cells of each VC;
   means for creating a pointer to each of said cell buffer means;
   a plurality of arbitration buffer means for buffering said pointers, each of said plurality of arbitration buffer means having a different priority; means for reading pointers from said arbitration buffer means, comprising:
   means for ordering the reading of said plurality of arbitration buffer means starting with a one of said plurality of arbitration buffer means having a highest priority;
   timer means for determining a predetermined interval for each of said arbitration buffer means other than said arbitration buffer means having the highest priority level;
   means for enabling each of said arbitration buffer means other than said arbitration buffer means having the highest priority level to be read upon the expiration of said predetermined interval associated with said arbitration buffer means; and
   means for transmitting cells from each of said cell buffer means to another of said plurality of controllers via said switch fabric according to pointers read from said arbitration buffer means.

2. An ATM network switch according to claim 1 wherein each of said plurality of controllers also includes:
   means for determining a priority level for each VC.

3. An ATM network switch according to claim 2 wherein said means for ordering further comprises:
   means for enabling said arbitration buffer having the highest priority level to be read first.

4. An ATM network switch according to claim 1 wherein:
   each of said plurality of cell buffer means is a FIFO which is dynamically configured in RAM.

5. An ATM network switch according to claim 1 wherein:
   each of said plurality of cell buffer means and said arbitration buffer means is a FIFO.

6. An ATM network switch according to claim 1, each of said plurality of controllers further comprises:
   means for receiving VC cells from the switch fabric;
   means for determining the VC of cells received from the switch fabric;
   a plurality of output cell buffer means for separately buffering groups of cells of each VC;
   means for creating an output pointer to each of said plurality of output cell buffer means;
   a plurality of output arbitration buffer means for buffering said output pointers;
   means for reading output pointers from said output arbitration buffer means; and
   means for transmitting cells from each of said plurality of output cell buffer means to one of said at least one external link according to output pointers read from said plurality of output arbitration buffer means.

7. An ATM network switch according to claim 6 wherein:
   said plurality of output arbitration buffer means includes traffic shaping means.

8. An ATM network switch according to claim 6 wherein each of said plurality of controllers further comprise:
   means for determining a priority level for each VC;
   said plurality of output arbitration buffer means comprises a separate output arbitration buffer means for each priority level; and
   said means for reading output pointers includes means for ordering the reading of said separate output arbitration buffer means.

9. An ATM network switch according to claim 8 wherein:
   one of said output arbitration buffer means has a highest priority; and
   said means for ordering the reading of said separate output arbitration buffer means causes said arbitration buffer means having the highest priority level to be read first.

10. An ATM network switch according to claim wherein said means for ordering the reading of said separate output arbitration buffers includes:
   timer means for determining a predetermined interval for each of said output arbitration buffer means other than said output arbitration buffer means having the highest priority level; and
   means for enabling each of said output arbitration buffer means other than said output arbitration buffer means having the highest priority level to be read upon the expiration of a predetermined interval associated with said output arbitration buffer means.

* * * * *